United States Patent [19]
Ancona et al.

[11] Patent Number: 5,520,104
[45] Date of Patent: May 28, 1996

[54] FOOD PREPARATION UTENSIL

[75] Inventors: Bruce Ancona; Jane Ancona; Mary J. deGuzman, all of New York, N.Y.; Craig LaRosa, Red Bank, N.J.

[73] Assignee: B. Via International Housewares, Inc., Englewood Cliffs, N.J.

[21] Appl. No.: 371,828

[22] Filed: Jan. 12, 1995

[51] Int. Cl.⁶ .................................................. B30B 9/00
[52] U.S. Cl. ........................... 99/495; 100/234; 100/125; 100/112
[58] Field of Search ............................ 99/495, 496, 497, 99/506, 507, 508, 509, 510, 513, 515; 100/234, 233, 243, 125, 112; D7/666, 665

[56] References Cited

U.S. PATENT DOCUMENTS

| | | | |
|---|---|---|---|
| 2,776,616 | 1/1957 | Sarossy | 100/234 |
| 3,580,168 | 5/1971 | Zysset . | |
| 4,069,752 | 1/1978 | Ahner | 100/234 |
| 4,466,346 | 8/1984 | Gemelli | 99/495 |
| 4,545,299 | 10/1985 | Ahner | 99/495 |
| 4,794,854 | 1/1989 | Swaim | 100/234 |
| 5,101,720 | 4/1992 | Bianchi | 99/506 |
| 5,163,362 | 11/1992 | Gaber et al. | 99/495 |
| 5,165,335 | 11/1992 | Bianchi | 100/112 |
| 5,303,640 | 4/1994 | Gaber et al. | 99/495 |
| 5,370,044 | 12/1994 | Lackie | 99/495 |

*Primary Examiner*—Timothy F. Simone
*Assistant Examiner*—Tony G. Soohoo
*Attorney, Agent, or Firm*—Henry D. Pahl, Jr.

[57] ABSTRACT

The food preparation utensil disclosed herein facilitates both the pressing and slicing of a foodstuff such as cloves of garlic. A first handle member provides a pressing cavity having an apertured or screen-like bottom and a slicing cavity having a series of parallel blades. A second handle member is pivotally joined to the first handle member and provides first and second plunger members for pressing a foodstuff placed in the respective cavity. A cover member is attached to the first handle member between the bottoms of the two cavities and is adapted to selectively close either the pressing apertures or the blades, the side of the cover member facing the first cavity carrying a plurality of pins which can project through and clear the pressing apertures.

8 Claims, 4 Drawing Sheets

5,520,104

FOOD PREPARATION UTENSIL

BACKGROUND OF THE INVENTION

The present invention relates to a hand operated food preparation utensil and more particularly to such a utensil which facilitates the pressing and/or slicing of a foodstuff such as cloves of garlic.

While various hand operated garlic presses have been devised heretofore, there has been no such device which equally facilitates the slicing of garlic cloves. Further, while some efforts have been made to facilitate the cleaning of such hand operated garlic presses after use, the expedients proposed heretofore have not been entirely satisfactory.

Among the several objects of the present invention, it may be noted that the provision of a novel food preparation utensil; the provision of such a utensil which facilitates the pressing of a foodstuff; the provision of such a utensil which facilitates the slicing of a foodstuff; the provision of such a utensil which is easily cleaned after use; the provision of such a utensil which is easy to use; the provision of such a utensil which is highly reliable and which is of relatively simple and inexpensive construction. Other objects and features will be in part as parent and in part pointed out hereinafter.

SUMMARY OF THE INVENTION

Briefly, a food preparation utensil according to the present invention involves first and second handle members extending from a pivotal connection which joins them. The first handle member provides first and second cavities for receiving a foodstuff while the second handle member provides corresponding first and second plunger members for pressing a foodstuff placed in the respective cavity. The bottom of the first cavity is provided with a plurality of holes so the juices expressed from a foodstuff being pressed may escape the cavity. The bottom of the second cavity comprises a series of parallel blades so that a foodstuff therein will be sliced. A cover member is pivotally attached to the first handle member between the bottoms of the first and second cavities and is adapted to selectively close either the plurality of holes or the series of blades. The side of the cover member facing the first cavity carries a plurality of pins which can project through and clear the holes after usage.

BRIEF DESCRIPTION OF THE DRAWINGS

Corresponding reference characters indicate corresponding parts throughout the several views of the drawings.

DESCRIPTION OF THE PREFERRED EMBODIMENTS

Figure 1:
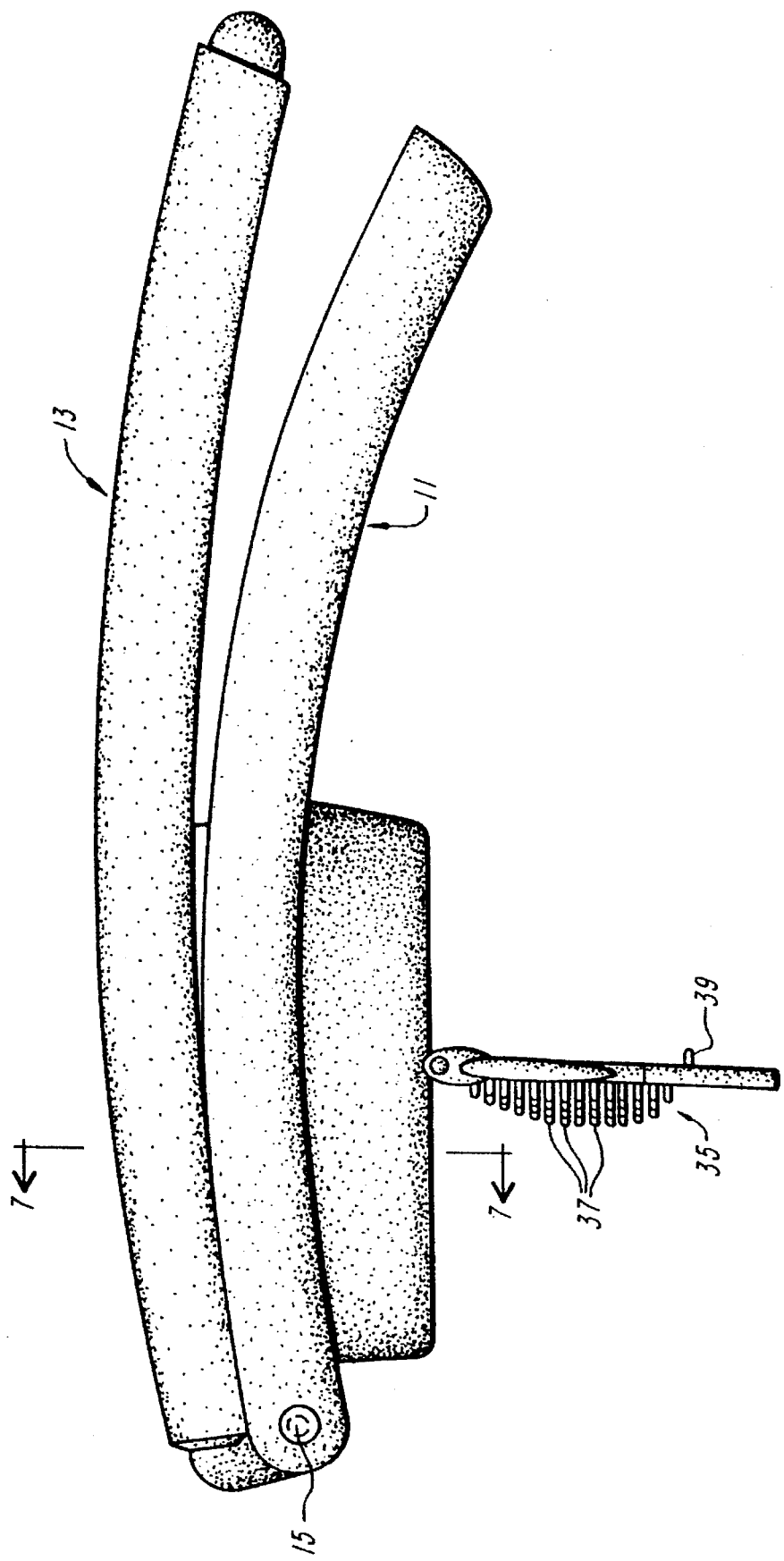
FIG. 1 is a side view of a food preparation utensil in accordance with the present invention.
Figure 2:
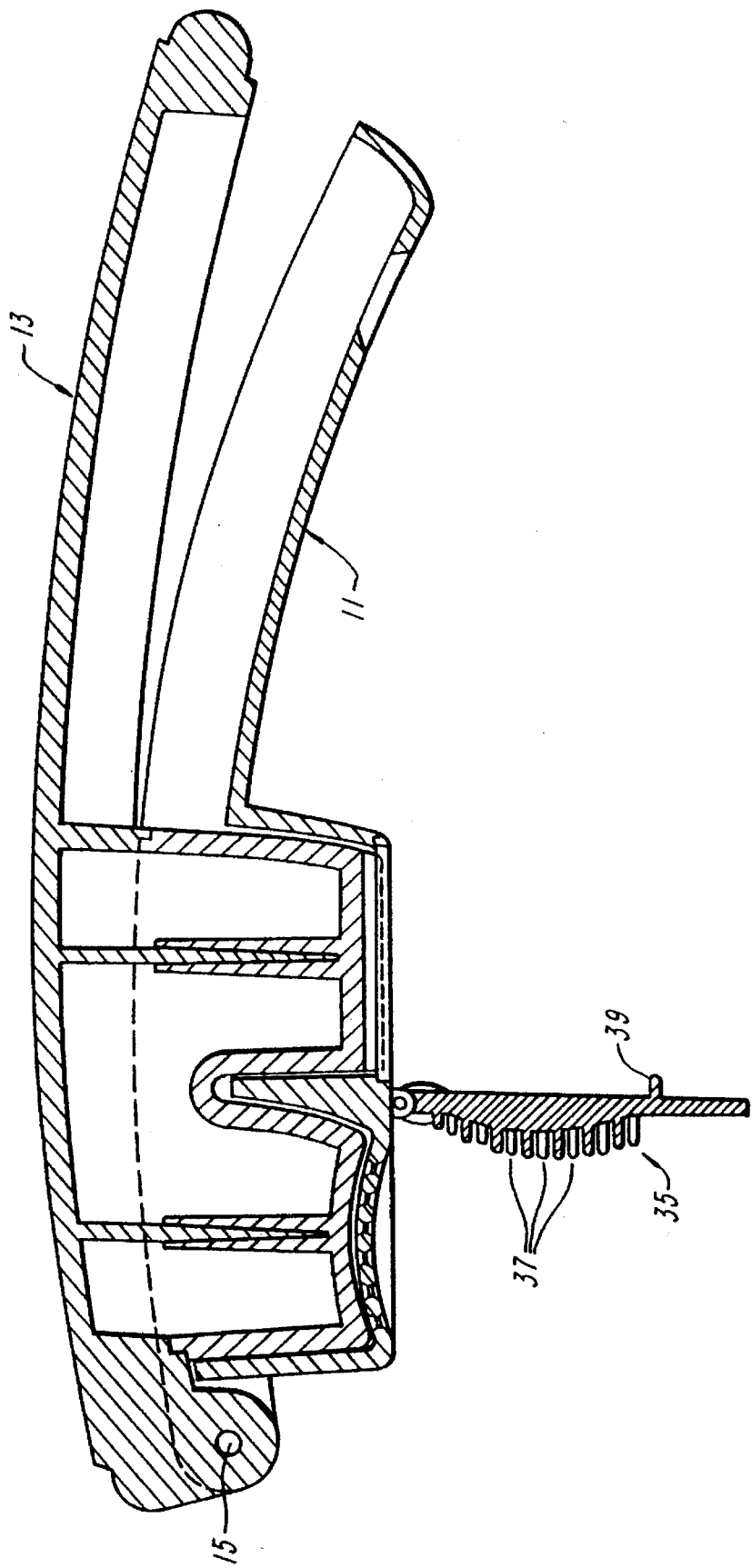
FIG. 2 is a side view of the utensil in section.

Referring now to the drawings, the food preparation utensil illustrated there involves first and second handle members, designated by reference characters 11 and 13 respectively, which are pivotally connected at one end by a pivot pin 15. Handle members 11 and 13 are preferably constructed of cast aluminum alloy but a high strength resin might also be used.

Figure 3:
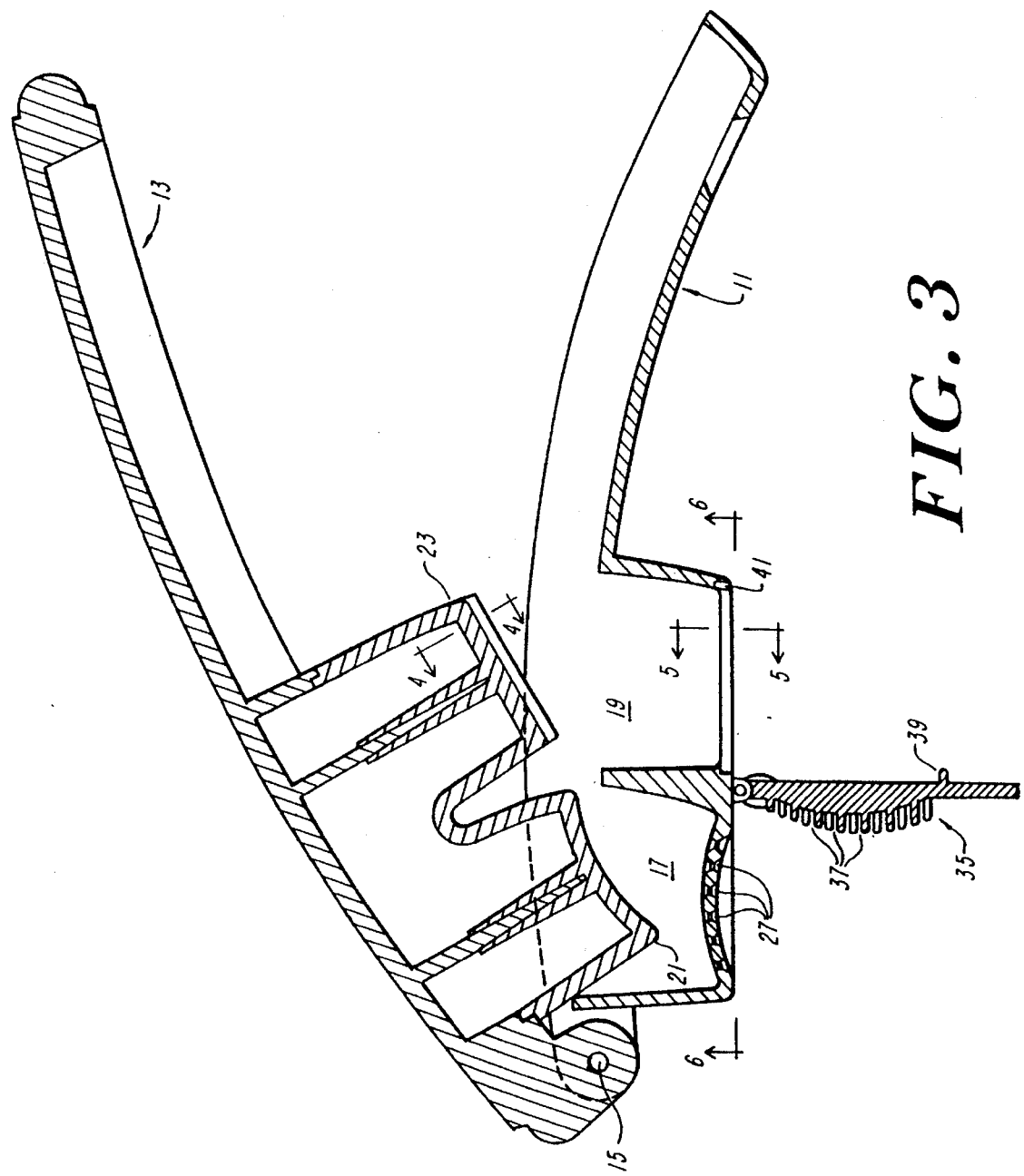
FIG. 3 is a side view in section of the utensil in an opened configuration.

The first handle member 11 provides first and second cavities, designated in FIG. 3 by reference characters 17 and 19 respectively, for receiving a foodstuff such as a clove of garlic. The bottom of the first cavity 17 is slightly domed or crowned so as to provide strength against buckling and is provided with a plurality of holes 27 so that juices expressed from a foodstuff being pressed in that cavity may escape.

The second handle member 13 provides plungers 21 and 23 which correspond to and mate with the cavities 17 and 19 so that the foodstuff placed within the respective cavity can be pressed or crushed by manual operation of the proximal ends of the handle portions 11 and 13. In the embodiment illustrated, the handle member 13 is constructed as two pieces which are then adhesively bonded or force fit together as illustrated, but an integral construction might also be employed.

Figure 4:
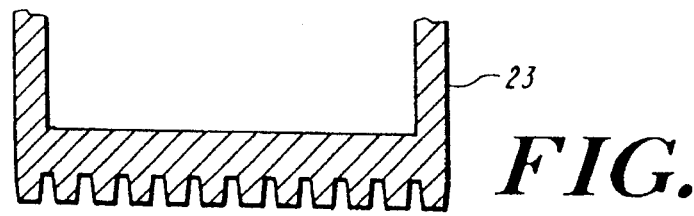
FIG. 4 is a sectional view taken substantially on line 4—4 of FIG. 3.
Figure 5:
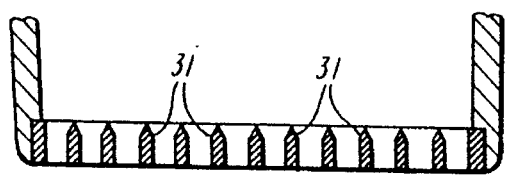
FIG. 5 is a sectional view taken substantially on the line 5—5 of FIG. 3.
Figure 6:
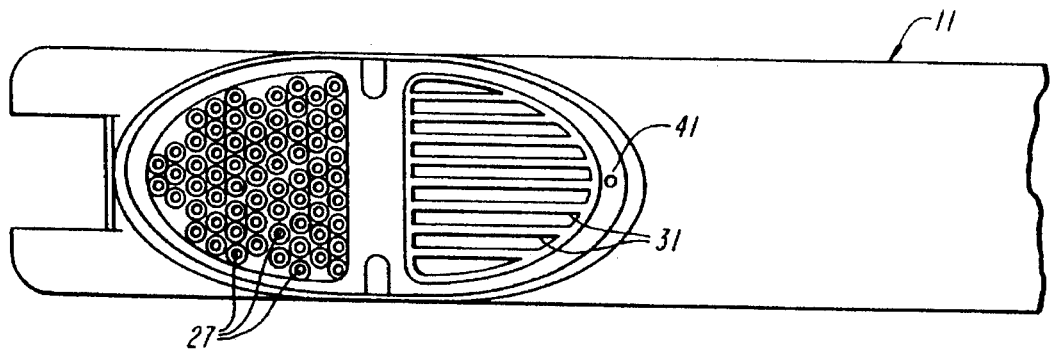
FIG. 6 is a bottom view taken substantially on the line 6—6 of FIG. 3.
Figure 7:
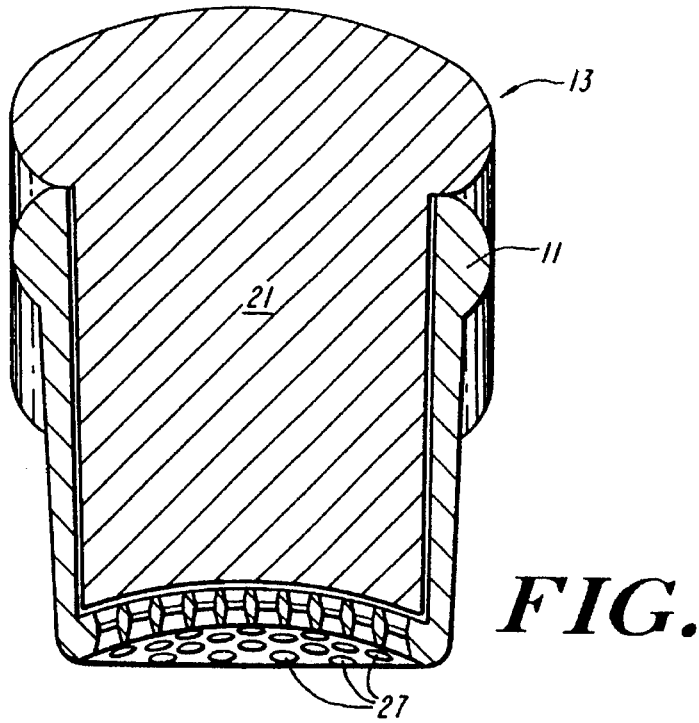
FIG. 7 is a sectional view taken substantially on the line 7—7 of FIG. 1.

The bottom of the second cavity 19 is provided with a series of parallel blades 31 as best seen in FIG. 5 so that a foodstuff being pressed down in that cavity will be sliced by passage through the blades. The blades 31 are preferably constructed of steel and are set into the bottom handle member 11 in a parallel array as illustrated. The bottom of the plunger 23 is preferably grooved, as is best seen in FIG. 4, in such a manner that the grooves receive the blades. Accordingly, a foodstuff being sliced will be driven completely through the blades, facilitating cleaning.

The cavities 17 and 19 are radially spaced from the pivot pin 15 with the crushing cavity 17 being closer to the pin so that a greater mechanical advantage is obtained for crushing or pressing as compared with the lesser force needed for slicing.

A cover member 35 is pivotally attached to the first handle member 11 between the bottoms of the two cavities 17 and 19 so as to selectively close either the plurality of holes 27 or the spaces between the blades 31. Cover member 31 is preferably constructed of a suitable plastic resin such as ABS (acrylonitrile butadiene styrene). The side of the cover member 35 facing the first cavity 17 carries a plurality of pins 37 which can project through and clear the holes 27. As is understood, this will greatly facilitate the cleaning of the device of residual foodstuff matter after use in pressing a foodstuff such as a clove of garlic. The side of the cover member 35 facing the cavity 19 carries a pin 39 which can be frictionally received in a mating socket or hole 41 in the handle member 11 so that the cover member can be retained out of the way when crushing a foodstuff in the cavity 17. During slicing, the pins 37 will act to retain the cover member in engagement with the bottom of cavity 17.

In view of the foregoing it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. A food preparation utensil comprising:

first and second handle members extending from a pivotal connection which joins them, said first handle member providing first and second cavities for receiving a foodstuff, said second handle member providing corresponding first and second plunger members for pressing a foodstuff placed in the respective cavity in said first handle member, the bottom of said first cavity being provided with a plurality of holes so that juices expressed from a foodstuff being pressed therein may escape the cavity, the bottom of said second cavity comprising a series of parallel blades so that a foodstuff being pressed therein will be sliced; and a cover member pivotally attached to said first handle member between the bottoms of said first and second cavities and being adapted selectively to close either said plurality of holes or said series of blades, the side of said cover member facing said first cavity carrying a plurality of pins which can project through and clear said holes of residual foodstuff matter.

2. A food preparation utensil as set forth in claim 1 wherein said cavities are radially spaced with respect to said pivotal connection with said first cavity being closer to said pivotal connection than said second cavity thereby to provide the greater mechanical advantage.

3. A food preparation utensil as set forth in claim 1 wherein said second plunger member is provided with a plurality of grooves which are aligned with and receive respective ones of said blades when said second plunger is driven into said second cavity.

4. A food preparation utensil as set forth in claim 1 wherein the portion of said cover spaced from the pivotal connection to said first handle member includes a pin and said first handle member incorporates a socket for receiving said pin when the cover is positioned to close over said blades thereby to retain said cover in such position.

5. A food preparation utensil as set forth in claim 4 wherein said handle members are metal and said cover member is constructed of a plastic resin.

6. A food preparation utensil as set forth in claim 5 wherein said metal is an aluminum alloy and said cover member is ABS plastic.

7. A food preparation utensil comprising:

first and second metal handle members extending from a pivotal connection which joins them, said first handle member providing first and second radially spaced cavities for receiving a food stuff, said second handle member providing corresponding radially spaced first and second plunger members for pressing a foodstuff placed in the respective cavity in said first handle member, said first cavity being closer to said pivotal connection than said second cavity thereby to provide the greater mechanical advantage the bottom of said first cavity being provided with a plurality of holes so that juices expressed from a foodstuff being pressed therein may escape the cavity, the bottom of said second cavity comprising a series of parallel blades so that a foodstuff being pressed therein will be sliced, the bottom of said second plunger member being provided with a plurality of grooves which are aligned with and receive respective ones of said blades when said second plunger is driven into said second cavity; and a cover member constructed of a plastic resin and pivotally attached to said first handle member between the bottoms of said first and second cavities and being adapted selectively to close either said plurality of holes or said series of blades, the side of said cover member facing said first cavity carrying a plurality of pins which can project through and clear said holes of residual foodstuff matter.

8. A food preparation utensil comprising:

first and second handle members extending from a pivotal connection which joins them, said first handle member providing first and second radially spaced cavities for receiving a food stuff, said second handle member providing corresponding radially spaced first and second plunger members for pressing a foodstuff placed in the respective cavity in said first handle member, said first cavity being closer to said pivotal connection than said second cavity thereby to provide the greater mechanical advantage the bottom of said first cavity being provided with a plurality of holes so that juices expressed from a foodstuff being pressed therein may escape the cavity, the bottom of said second cavity comprising a series of parallel blades so that a foodstuff being pressed therein will be sliced, said second plunger member being provided with a plurality of grooves which are aligned with and receive respective ones of said blades when said second plunger is driven into said second cavity, said food preparation utensil further comprising a cover member pivotally attached to said first handle member between the bottoms of said first and second cavities and being adapted selectively to close either said plurality of holes or said series of blades, the side of said cover member facing said first cavity carrying a plurality of pins which can project through and clear said holes of residual foodstuff matter.

* * * * *